(12) United States Patent
Taccari et al.

(10) Patent No.: US 11,756,431 B2
(45) Date of Patent: Sep. 12, 2023

(54) SYSTEMS AND METHODS FOR UTILIZING MODELS TO IDENTIFY A VEHICLE ACCIDENT BASED ON VEHICLE SENSOR DATA AND VIDEO DATA CAPTURED BY A VEHICLE DEVICE

(71) Applicant: Verizon Connect Development Limited, Dublin (IE)

(72) Inventors: Leonardo Taccari, Florence (IT); Luca Kubin, Collecchio (IT); Tommaso Bianconcini, Florence (IT); Andrea Benericetti, Prato (IT); Leonardo Sarti, Sesto Fiorentino (IT); Tommaso Innocenti, Florence (IT)

(73) Assignee: Verizon Connect Development Limited, Dublin (IE)

( * ) Notice: Subject to any disclaimer, the term of this patent is extended or adjusted under 35 U.S.C. 154(b) by 0 days.

(21) Appl. No.: 17/659,928

(22) Filed: Apr. 20, 2022

(65) Prior Publication Data
US 2022/0245935 A1 Aug. 4, 2022

Related U.S. Application Data

(63) Continuation of application No. 16/793,829, filed on Feb. 18, 2020, now Pat. No. 11,328,505.

(51) Int. Cl.
*G06V 20/10* (2022.01)
*G08G 1/00* (2006.01)
(Continued)

(52) U.S. Cl.
CPC ........... *G08G 1/205* (2013.01); *B64C 39/024* (2013.01); *G06N 3/04* (2013.01); *G06V 10/771* (2022.01);
(Continued)

(58) Field of Classification Search
CPC ...... G08G 1/205; G08G 1/164; B64C 39/024; G06N 3/04; G06N 3/045; G06N 3/042;
(Continued)

(56) References Cited

U.S. PATENT DOCUMENTS

| 5,044,195 A | 9/1991 | James et al. |
| 5,332,180 A | 7/1994 | Peterson et al. |

(Continued)

FOREIGN PATENT DOCUMENTS

| CN | 103198711 | * 12/2014 |
| CN | 206781626 | * 12/2017 |

(Continued)

OTHER PUBLICATIONS

Farneback, et al., "Two-frame motion estimation based on polynomial expansion", http://www.diva-portal.org/smash/get/diva2:273847/FULLTEXT01.pdf, Jun. 24, 2003, 8 pages.

*Primary Examiner* — Jerome Grant, II

(57) ABSTRACT

A device may receive sensor data and video data associated with a vehicle, and may process the sensor data, with a rule-based detector model, to determine whether a probability of a vehicle accident satisfies a first threshold. The device may preprocess acceleration data of the sensor data to generate calibrated acceleration data, and may process the calibrated acceleration data, with an anomaly detector model, to determine whether the calibrated acceleration data includes anomalies. The device may filter the sensor data to generate filtered sensor data, and may process the filtered sensor data and anomaly data, with a decision model, to determine whether the probability of the vehicle accident satisfies a second threshold. The device may process the filtered sensor data, the anomaly data, and the video data,
(Continued)

with a machine learning model, to determine whether the vehicle accident has occurred, and may perform one or more actions.

20 Claims, 12 Drawing Sheets

(51) Int. Cl.
| | |
|---|---|
| *G06N 3/04* | (2023.01) |
| *B64C 39/02* | (2023.01) |
| *G08G 1/16* | (2006.01) |
| *G06V 10/771* | (2022.01) |
| *G06V 10/80* | (2022.01) |
| *G06V 10/98* | (2022.01) |
| *G06V 20/56* | (2022.01) |
| *B64U 101/30* | (2023.01) |

(52) U.S. Cl.
CPC ............ *G06V 10/806* (2022.01); *G06V 10/98* (2022.01); *G06V 20/10* (2022.01); *G06V 20/56* (2022.01); *G08G 1/164* (2013.01); *B64U 2101/30* (2023.01)

(58) Field of Classification Search
CPC ........ G06N 20/10; G06N 3/08; G06V 10/771; G06V 10/806; G06V 10/98; G06V 20/10; G06V 20/56; B64U 2101/30; B64U 2101/60; G06F 18/2113; G06F 18/253; G08B 25/016; G08B 29/188
USPC .................................................. 382/110, 117
See application file for complete search history.

(56) References Cited

U.S. PATENT DOCUMENTS

| | | | |
|---|---|---|---|
| 8,914,196 B1 | 12/2014 | Breed et al. | |
| 11,120,647 B1* | 9/2021 | Brandmaier | G08G 1/162 |
| 11,162,800 B1* | 11/2021 | Carbery | G01C 21/28 |
| 2017/0011465 A1* | 1/2017 | Anastassov | G06Q 40/08 |
| 2018/0056480 A1 | 3/2018 | Tegoeh et al. | |
| 2018/0322197 A1* | 11/2018 | Hesterman | G06F 16/7335 |
| 2021/0049837 A1 | 2/2021 | Karnik et al. | |
| 2021/0114606 A1 | 4/2021 | Alvarez et al. | |
| 2021/0194641 A1* | 6/2021 | Liu | H04L 1/1887 |

FOREIGN PATENT DOCUMENTS

| | | | | |
|---|---|---|---|---|
| JP | 2005170370 | * | 6/2005 | |
| JP | 6347242 | * | 6/2018 | |
| KR | 20140128236 | * | 11/2014 | ............ B60W 50/00 |

* cited by examiner

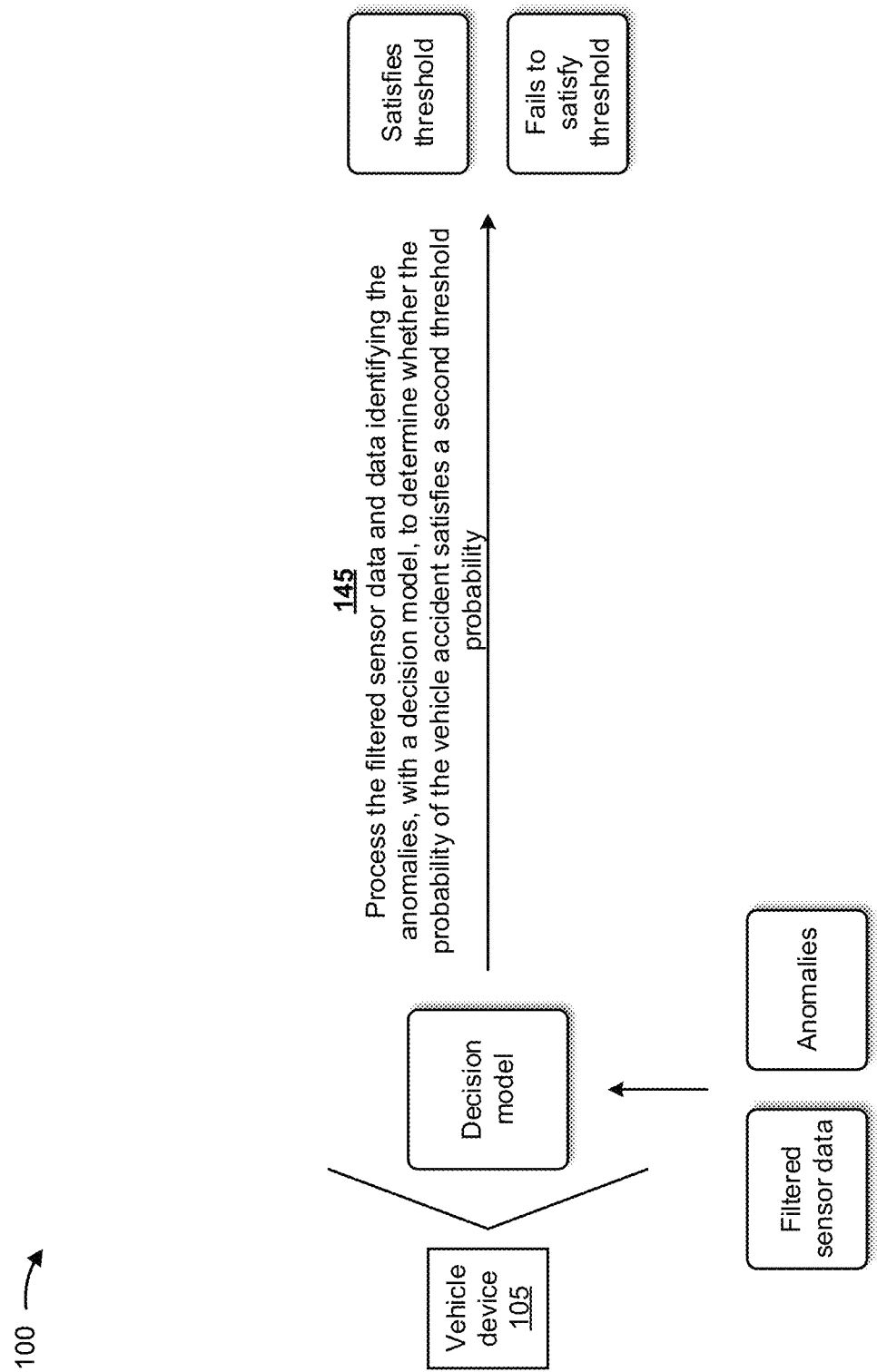

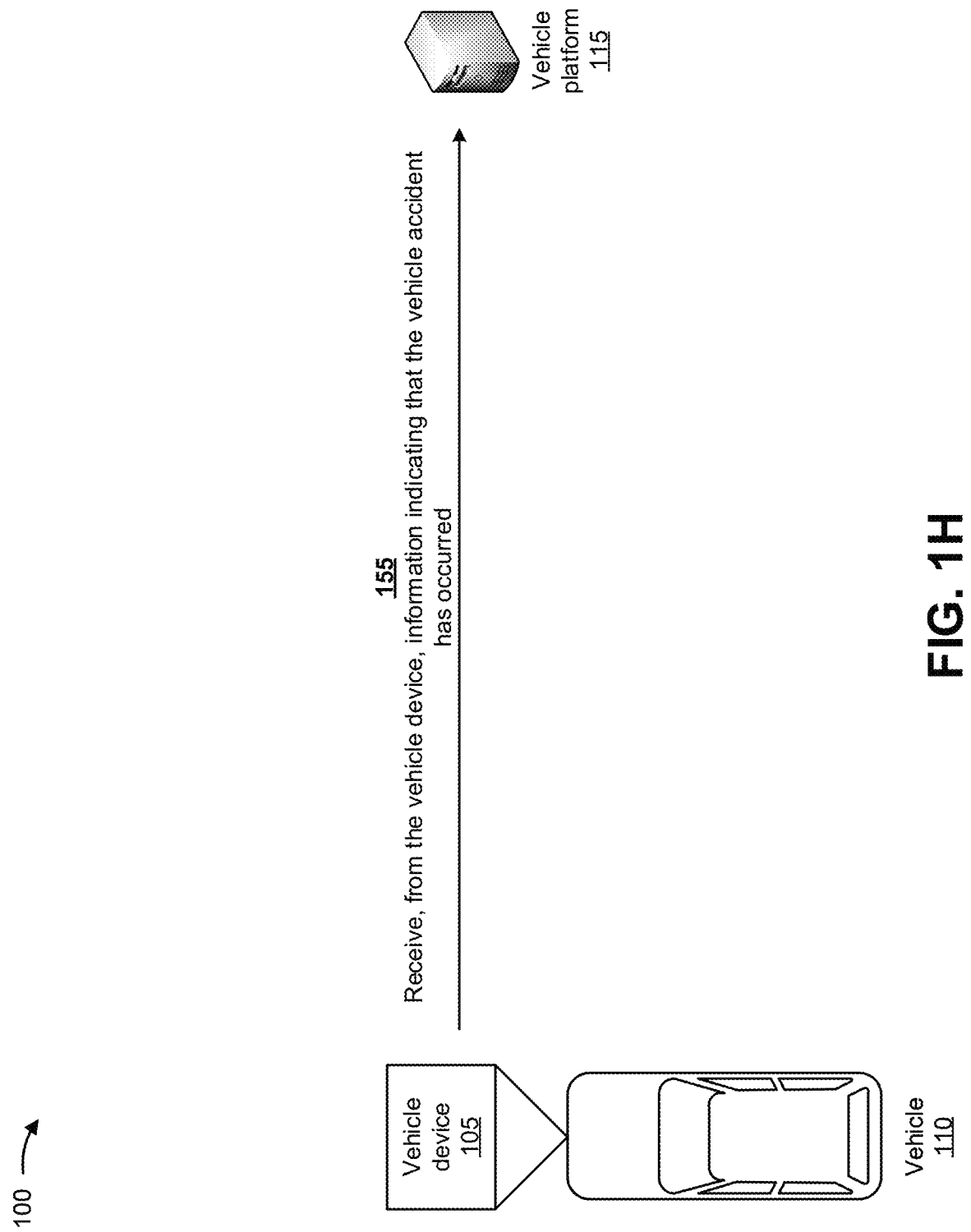

SYSTEMS AND METHODS FOR UTILIZING
MODELS TO IDENTIFY A VEHICLE
ACCIDENT BASED ON VEHICLE SENSOR
DATA AND VIDEO DATA CAPTURED BY A
VEHICLE DEVICE

RELATED APPLICATION

This application is a continuation of U.S. patent application Ser. No. 16/793,829, entitled "SYSTEMS AND METHODS FOR UTILIZING MODELS TO IDENTIFY A VEHICLE ACCIDENT BASED ON VEHICLE SENSOR DATA AND VIDEO DATA CAPTURED BY A VEHICLE DEVICE," filed Feb. 18, 2020, which is incorporated herein by reference in its entirety.

BACKGROUND

Vehicles may be equipped with several vehicle devices that enable capture of sensor data, such as images or video surrounding the vehicle, engine parameters, vehicle operation parameters, and/or the like. For example, a vehicle may include a dash camera, several parking assist cameras, a backup assist camera, an on-board diagnostic (OBD) device, an electronic control unit (ECU), and/or the like that enable capture of sensor data for different purposes.

BRIEF DESCRIPTION OF THE DRAWINGS

FIGS. 1A-1I are diagrams of one or more example implementations described herein.

Figure 1A:
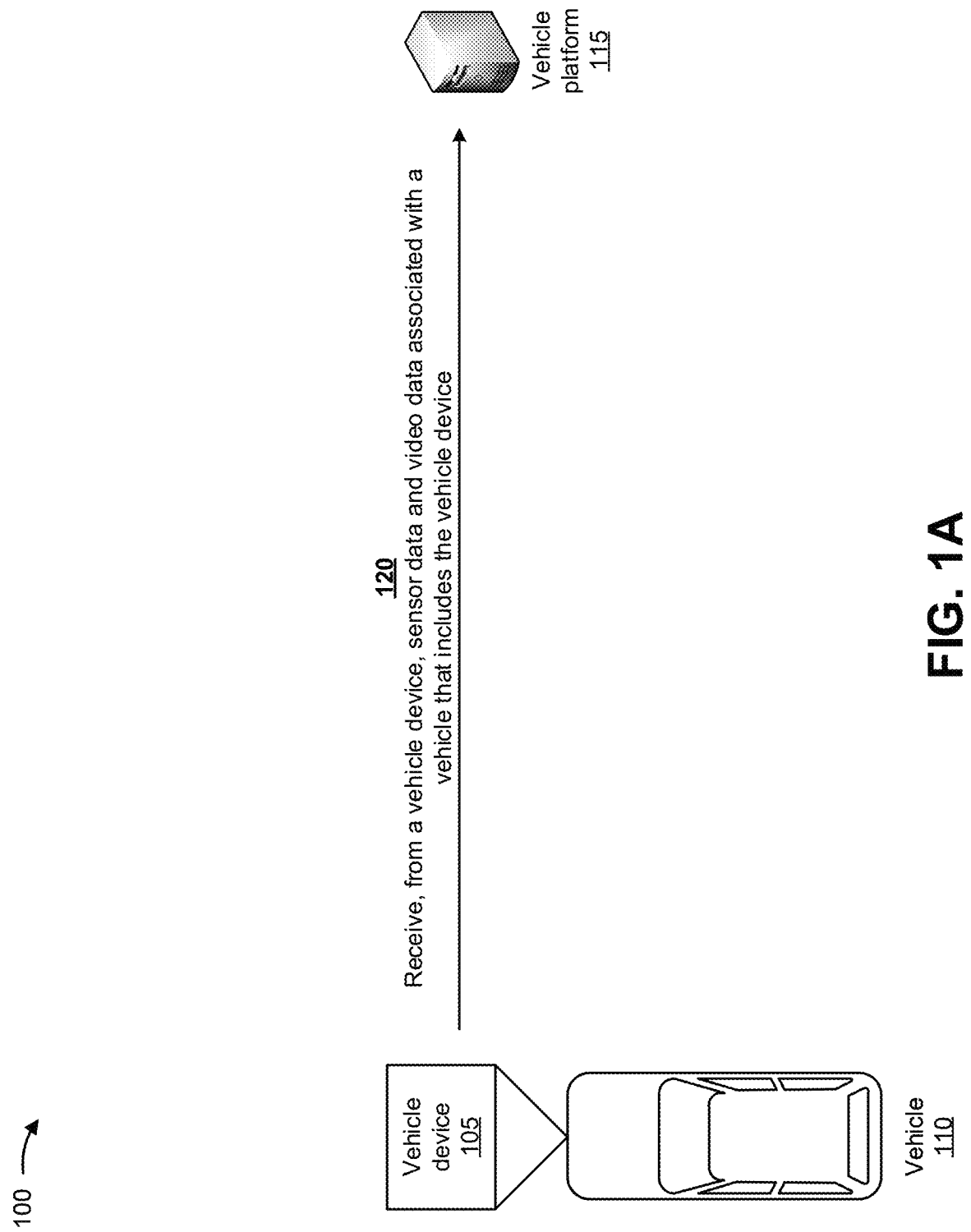

DETAILED DESCRIPTION OF PREFERRED
EMBODIMENTS

The following detailed description of example implementations refers to the accompanying drawings. The same reference numbers in different drawings may identify the same or similar elements.

Vehicle devices may capture vehicle data (e.g., images or video, vehicle operation data, vehicle diagnostic data, and/or the like) for specific purposes based on instructions received from an OBD device, an ECU, and/or the like of the vehicle. For example, the vehicle devices may cause vehicle data, such as global positioning system (GPS) data (e.g., a longitude, a latitude, a speed, a heading direction, and/or the like), odometer data, engine speed data, vehicle speed data, vehicle acceleration data, gyroscope data, engine torque data, and/or the like to be captured. Such vehicle data may be utilized by separate systems to analyze the vehicle and/or operation of the vehicle. However, current techniques do not fully utilize capabilities of vehicle devices and the captured vehicle data when vehicle accidents occur. Thus, current techniques waste computing resources (e.g., processing resources, memory resources, communication resources, and/or the like), networking resources, and/or the like associated with investigating vehicle accidents for liability purposes, contacting emergency personnel, handling legal ramifications associated with vehicle accidents, and/or the like.

Some implementations described herein provide a vehicle device and/or a vehicle platform that utilizes several stages of crash detection, including models, to identify a vehicle accident based on vehicle sensor data and video data captured by the vehicle device. For example, in the first stage, the vehicle device may receive low latency sensor data such as accelerometer data and may process the sensor data, with a rule-based detector model, to determine whether a probability of a vehicle accident satisfies a first threshold probability. The vehicle device may preprocess acceleration data of the sensor data to generate calibrated acceleration data when the probability of the vehicle accident satisfies the first threshold probability, and may process the calibrated acceleration data, with an anomaly detector model, to determine whether the calibrated acceleration data includes anomalies. The vehicle device may filter the sensor data to remove noisy sensor data and erroneous vehicle accident data from the sensor data, to generate filtered sensor data, and may process the filtered sensor data and data identifying the anomalies, with a decision model, to determine whether the probability of the vehicle accident satisfies a second threshold probability that is greater than the first threshold probability. The vehicle device may process, based on the probability of the vehicle accident satisfying the second threshold probability, the filtered sensor data, the data identifying the anomalies, and the video data, with a machine learning model, to determine whether the vehicle accident has occurred, and may perform one or more actions based on determining that the vehicle accident has occurred.

In some implementations, the vehicle device and/or the vehicle platform may utilize a multi-stage approach to filter out false positives associated with vehicle accident detection. For example, if the first stage (e.g., the sensor data) fails to detect a possible vehicle accident, additional stages may not be triggered. The first stage of the approach may identify possible vehicle accidents, where some of the possible vehicle accidents may be false positives that are filtered out by the next stages of the approach. Performance of each stage may be slower than a previous stage (e.g., the first stage involves a threshold determination and the last stage involves processing with a deep neural network). In some implementations, only a fastest stage of the approach (i.e., the first stage) may process all candidate events, the second stage may process the events proposed by the first stage, and the third stage may process the events proposed by the second stage (e.g., which is a subset of the events proposed by the first stage). Thus, the vehicle device and/or the vehicle platform may not perform processor-intensive functions (e.g., video analysis) until less processor-intensive functions indicate that a vehicle accident has occurred.

In some implementations, the multi-stage approach to filtering out false positives may be utilized to detect events other than vehicle accidents. For example, the multi-stage approach may be utilized to detect aggressive driving behavior (e.g., tailgating, excessive lane changing, and/or the like, poor driving behavior (e.g., swerving, hard braking, and/or the like), and/or the like.

In this way, the vehicle device utilizes models to identify a vehicle accident based on vehicle sensor data and video data captured by the vehicle device. The vehicle device may automatically warn interested parties (e.g., a business owner, an insurer, emergency personnel, and/or the like) about vehicle accidents immediately after occurrence of the vehicle accidents. The vehicle device may provide evidence to establish and prove liability associated with the vehicle accident. Thus, the vehicle device conserves computing resources (e.g., processing resources, memory resources, communication resources, and/or the like), networking resources, and/or the like that would otherwise be wasted in investigating vehicle accidents for liability purposes, contacting emergency personnel, handling legal ramifications associated with vehicle accidents, and/or the like.

FIGS. 1A-1I are diagrams of one or more example implementations 100 described herein. As shown in FIG. 1A, a vehicle device 105 may be associated with a vehicle 110 and a vehicle platform 115. In some implementations, vehicle device 105 may include a device (e.g., OBD devices, ECUs, and/or the like) that receives vehicle data (e.g., data indicating acceleration, speed, movement, and/or the like) and/or controls other vehicle devices, a vehicle sensor (e.g., a GPS device, a gyroscope, an accelerometer, and/or the like) that captures the vehicle data, a device (e.g., dash cameras, parking assist cameras, backup assist cameras, and/or the like) that captures images or video, and/or the like associated with vehicle 110. In some implementations, vehicle device 105 may include a single device that captures the aforementioned vehicle data and/or video data, multiple devices that capture the aforementioned vehicle data and/or video data, and/or the like. In some implementations, vehicle device 105 may utilize models to identify a vehicle accident based on vehicle sensor data and video data captured by vehicle device 105. Vehicle platform 115 may include a platform that utilizes models to identify a vehicle accident based on vehicle sensor data and video data provided by vehicle device 105. Although several implementations are described herein as being performed by vehicle device 105, such implementations may be performed solely by vehicle device 105, jointly by vehicle device and vehicle platform 115, or solely by vehicle platform 115.

As further shown in FIG. 1A, and by reference number 120, vehicle platform 115 may receive, from vehicle device 105, sensor data and video data (e.g., optionally) associated with vehicle 110 that includes vehicle device 105. In some implementations, the sensor data may include location data identifying one or more locations of vehicle 110 during a period of time, speed data identifying speeds of vehicle 110 during the period of time, acceleration data identifying accelerations of vehicle 110 during the period of time, gyroscope data identifying angular speeds of vehicle 110 during the period of time, and/or the like. In some implementations, the sensor data may include global positioning system (GPS) data (e.g., coordinates, longitude, latitude, heading, direction, and/or the like) captured by vehicle device 105 and/or vehicle 110. The GPS data may include a collection of GPS samples for vehicle 110. Each sample (e.g., a point) may include a location of vehicle 110 as a (latitude, longitude) pair, a sample timestamp, a direction of vehicle 110 (e.g., in degrees, where zero degrees points north), speed and altitude information associated with vehicle 110, and/or the like. The acceleration data may include accelerometer data captured by an accelerometer of vehicle device 105 and/or vehicle 110, acceleration values representing acceleration at each of three axes in three-dimensional space, and/or the like. The gyroscope data may include angular speed data captured by a gyroscope of vehicle device 105 and/or vehicle 110, angular speed values representing angular speed with respect to each of the three axes, and/or the like. Additionally, the sensor data may include odometer readings, engine speeds, vehicle speeds, engine torques, lateral accelerations, brake pedal switch counts, brake pedal times while moving, brake pedal times, driver seatbelt fastened indicators, fuel consumptions (e.g., fuel level, fuel remaining, fuel rate, and/or the like), fluid (e.g., engine oil, transmission fluid, and/or the like) levels, tire pressures, battery voltages, manifold pressures, fuel rail pressures, exhaust fluid levels, total engine hours, phone usage data, data indicating whether the driver was maintaining a safe speed in weather conditions, data indicating whether the driver was maintaining a safe distance from other vehicles, and/or the like associated with vehicle 110.

In some implementations, the video data may include video footage taken from one or more video cameras associated with vehicle 110. In some implementations, in order for vehicle device 105 to capture, store, collect, process, communicate, and/or the like the sensor data and/or the video data, vehicle device 105 may include or receive information from one or more video cameras and/or video recorders (e.g., a front-facing video camera/recorder, a side video camera/recorder, a rear-facing video camera/recorder, and/or the like) capable of continuously capturing and/or recording video footage; may include or receive information from telematics sensors (e.g., a GPS sensor, an accelerometer, and/or the like) capable of capturing acceleration on the three axes; may include data connectivity capable of transmitting large size files; may include processing power (e.g., one or more central processing units (CPUs), graphics processing units (GPUs), and/or the like); and/or the like.

These functionalities may be provided by a single device, or by multiple on-board components or devices, of vehicle device 105 and/or vehicle 110. Components that implement the functionalities may be linked so that sensors and video camera/recorders are recording continuously, and vehicle device 105 may transmit the sensor data and video data via the data connection. In some implementations, the components may execute completely on vehicle device 105. Additionally, or alternatively, some or all of the components may be distributed and may communicate with vehicle device 105. For example, fast procedures may be executed by vehicle device 105 and computing-intensive procedures may be executed by vehicle platform 115 or a combination of vehicle device 105 and vehicle platform 115.

For example, vehicle device 105 may include a vehicle tracking unit device with telematics sensors and data connectivity, and may include a front-facing dashboard camera (or dash cam) that may be equipped with telematics sensors and data connectivity (e.g., a "smart" dashcam) or may be purely a video recorder (e.g., a "dumb" dashcam), connected to the vehicle tracking unit device. The vehicle tracking unit device may be an external device that is mounted in vehicle 110 to track the GPS position and telematics behavior of vehicle 110, or may be an internal component of vehicle 110 that is able to store and transmit telematics data. In some implementations, vehicle platform 115 may include or may be associated with a remote server pool that analyzes the sensor data and/or video data in real-time.

As described herein, vehicle device 105 and/or vehicle platform 115 may process the sensor data, the video data, and/or resulting data to determine whether a vehicle accident has occurred with vehicle 110. In some implementations, vehicle device 105 and/or vehicle platform 115 may process the sensor data, the video data, and/or the resulting data with a method of increasingly complex and/or increasingly computationally-intensive models, and may continue the method as long as processing continues to indicate a threshold probability that an accident may have occurred. For example, as described below, vehicle device 105 and/or vehicle platform 115 may employ a rule-based detector model, then a decision model, and then a machine learning model to determine whether a vehicle accident has occurred. In some implementations, all of the models may be executed by vehicle device 105. Alternatively, one or more of the models (e.g., those performing more complex or more computationally intensive detection algorithms) may be executed externally to vehicle device 105, such as by vehicle platform 115.

Figure 1B:
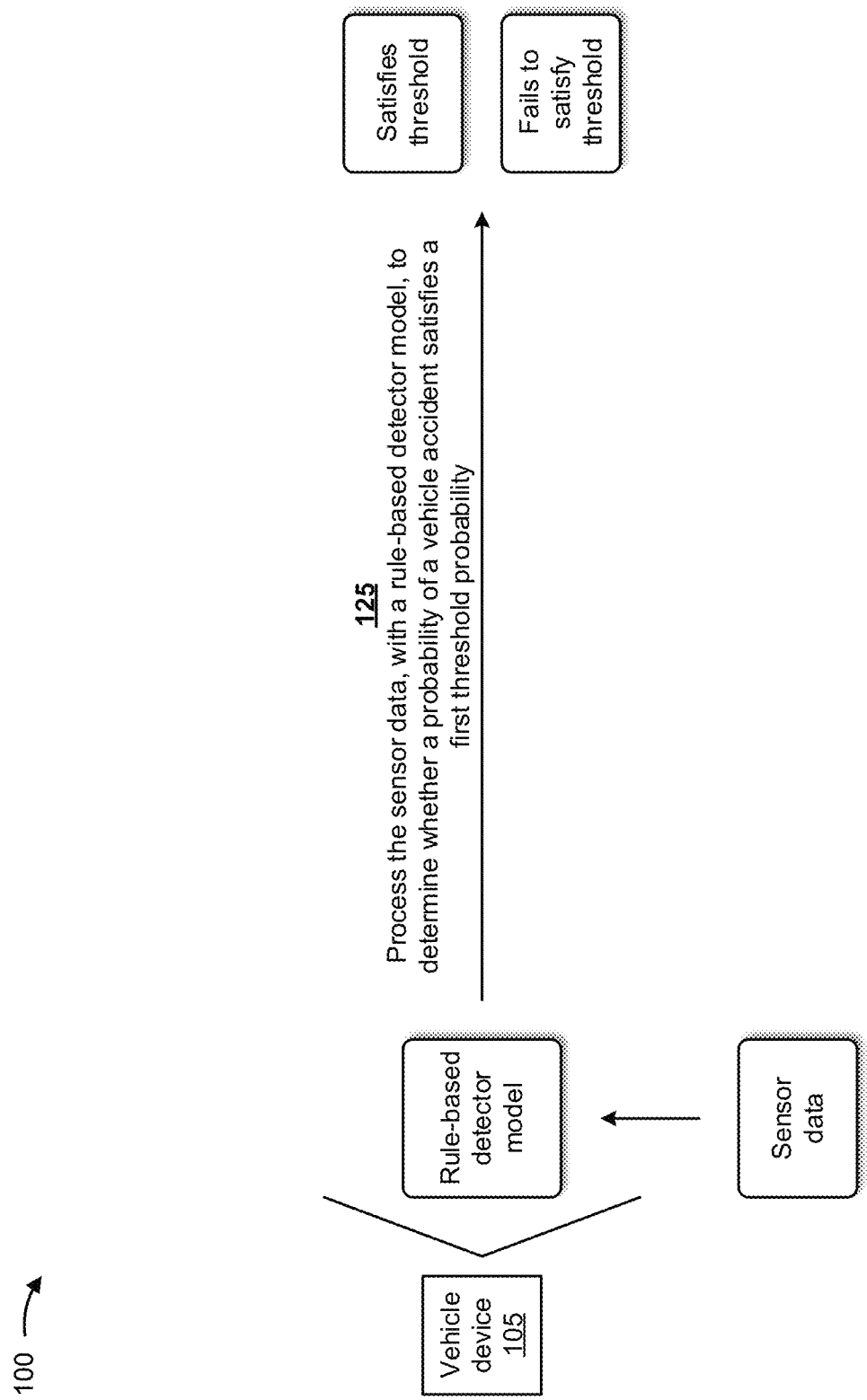

As shown in FIG. 1B, and by reference number 125, vehicle device 105 may process the sensor data, with a rule-based detector model, to determine whether a probability of a vehicle accident satisfies a first threshold probability. In some implementations, the rule-based detector model may consider instantaneous acceleration as provided by the accelerometer to determine whether a probability of a vehicle accident satisfies the first threshold probability. For example, vehicle device 105 may determine that the probability of a vehicle accident satisfies a first threshold probability if acceleration for any of the three axes is above a threshold acceleration (e.g., 700 milli-gal) for more than a threshold length of time (e.g., 0.1 seconds).

In some implementations, vehicle platform 115 may train the model (e.g., the rule-based detector model) with the historical sensor data and/or historical video data) to generate a trained model that determines whether a probability of a vehicle accident satisfies a first threshold probability. In some implementations, vehicle platform 115 may separate the historical sensor data and/or historical video data into a training set, a validation set, a test set, and/or the like. The training set may be utilized to train the model. The validation set may be utilized to validate results of the trained model. The test set may be utilized to test operation of the model.

In some implementations, vehicle platform 115 may train the model using, for example, an unsupervised training procedure and based on the historical sensor data and/or historical video data. For example, vehicle platform 115 may perform dimensionality reduction to reduce the historical sensor data and/or historical video data to a minimum feature set, thereby reducing resources (e.g., processing resources, memory resources, and/or the like) to train the model, and may apply a classification technique to the minimum feature set.

In some implementations, vehicle platform 115 may use a logistic regression classification technique to determine a categorical outcome (e.g., that the historical sensor data and/or historical video data indicate a probability of an accident satisfying a threshold probability). Additionally, or alternatively, vehicle platform 115 may use a naïve Bayesian classifier technique. In this case, vehicle platform 115 may perform binary recursive partitioning to split the historical sensor data and/or historical video data into partitions and/or branches and use the partitions and/or branches to determine outcomes (e.g., that the historical sensor data and/or historical video data indicates a probability of an accident satisfying a threshold probability). Based on using recursive partitioning, vehicle platform 115 may reduce utilization of computing resources relative to manual, linear sorting and analysis of data points, thereby enabling use of thousands, millions, or billions of data points to train the model, which may result in a more accurate model than using fewer data points.

Additionally, or alternatively, vehicle platform 115 may use a support vector machine (SVM) classifier technique to generate a non-linear boundary between data points in the training set. In this case, the non-linear boundary is used to classify test data into a particular class.

Additionally, or alternatively, vehicle platform 115 may train the model using a supervised training procedure that includes receiving input to the model from a subject matter expert, which may reduce an amount of time, an amount of processing resources, and/or the like to train the model relative to an unsupervised training procedure. In some implementations, vehicle platform 115 may use one or more other model training techniques, such as a neural network technique, a latent semantic indexing technique, and/or the like. For example, vehicle platform 115 may perform an artificial neural network processing technique (e.g., using a two-layer feedforward neural network architecture, a three-layer feedforward neural network architecture, and/or the like) to perform pattern recognition with regard to patterns of the historical sensor data and/or historical video data. In this case, using the artificial neural network processing technique may improve an accuracy of the trained model generated by vehicle platform 115 by being more robust to noisy, imprecise, or incomplete data, and by enabling vehicle platform 115 to detect patterns and/or trends undetectable to human analysts or systems using less complex techniques.

In some implementations, rather than training the model, vehicle platform 115 may receive a trained model from another device (e.g., a server device). For example, a server device may generate the trained model based on having trained the model in a manner similar to that described above, and may provide the trained model to vehicle platform 115 (e.g., may pre-load vehicle platform 115 with the trained model, may receive a request from vehicle platform 115 for the trained model, and/or the like).

If the rule-based detector model determines that the probability of the vehicle accident satisfies the first threshold probability, vehicle device 105 may continue processing, as described below. In some implementations, if the probability of the vehicle accident satisfies the first threshold probability, vehicle device 105 may trigger storage of the video data. If vehicle device 105 determines that the probability of the vehicle accident fails to satisfy the first threshold probability, vehicle device 105 may terminate processing of the sensor data and the video data. In this case, vehicle device 105 may provide, to vehicle platform 115 and/or an operator of vehicle 110, an indication that a vehicle accident does not appear to have occurred.

Additionally, or alternatively, if vehicle device 105 determines that the probability of the vehicle accident fails to satisfy the first threshold probability, vehicle device 105 may receive new sensor data and/or new video data associated with vehicle 110. In this case, vehicle device 105 may process the new sensor data and/or new video data, with the rule-based detector model, to again determine whether a probability of a vehicle accident satisfies the first threshold probability.

Figure 1C:
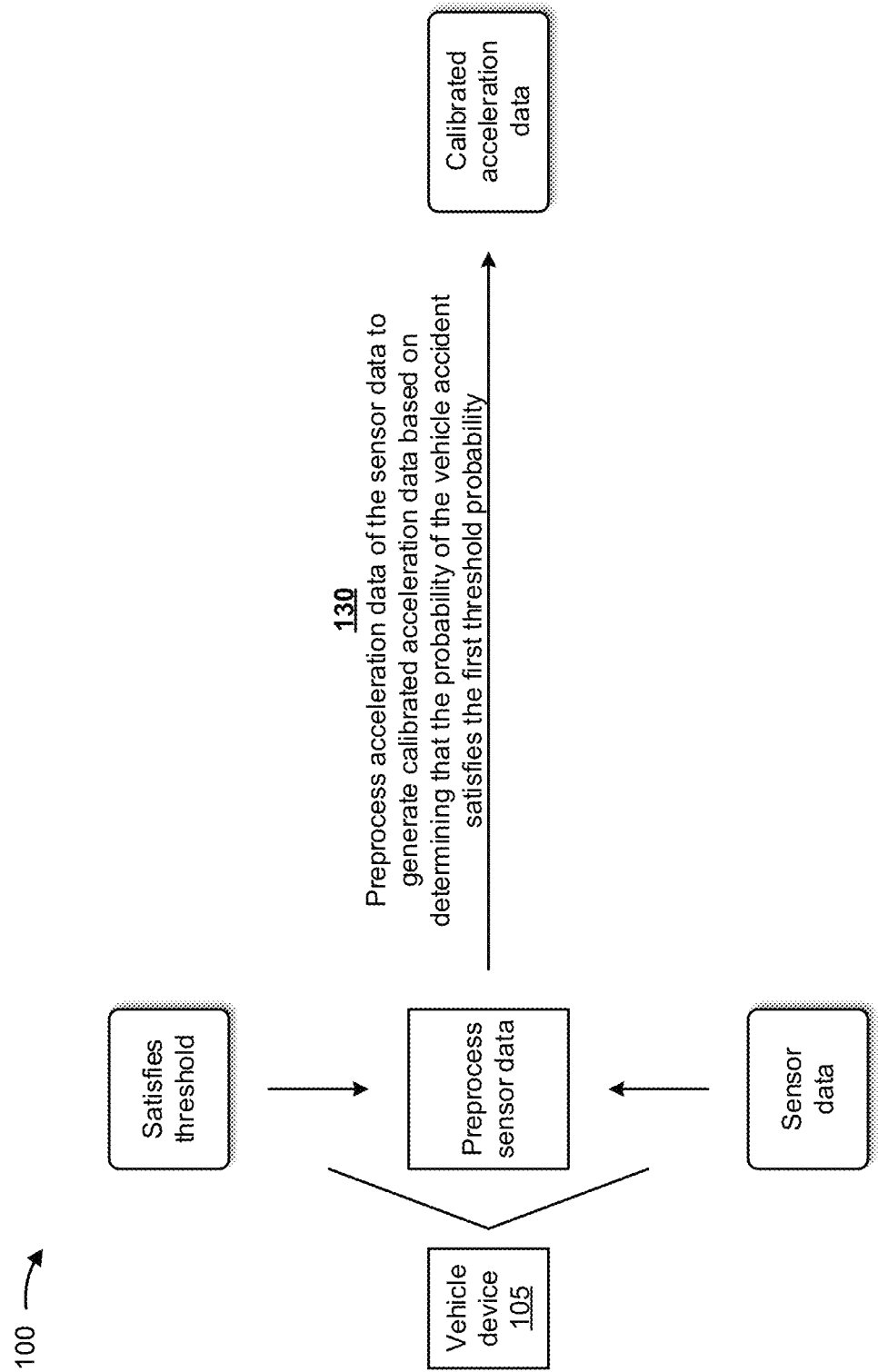

As shown in FIG. 1C, and by reference number 130, vehicle device 105 may preprocess acceleration data of the sensor data to generate calibrated acceleration data based on determining that the probability of the vehicle accident satisfies the first threshold probability. For example, vehicle device 105 may calibrate the acceleration data to make the acceleration data independent of vibration effects caused due to an accelerometer montage and to generate the calibrated acceleration data. Proper mounting of an accelerometer (e.g., accelerometer montage) is critical for optimal performance of the accelerometer. Incorrect accelerometer mounting techniques can result in grossly inaccurate vibration data from the accelerometer. After calibrating the acceleration data, the earth gravity may be completely measured on a z-axis of the accelerometer. In some implementations, vehicle device 105 may apply a rotation matrix to calibrate the acceleration data.

Figure 1D:
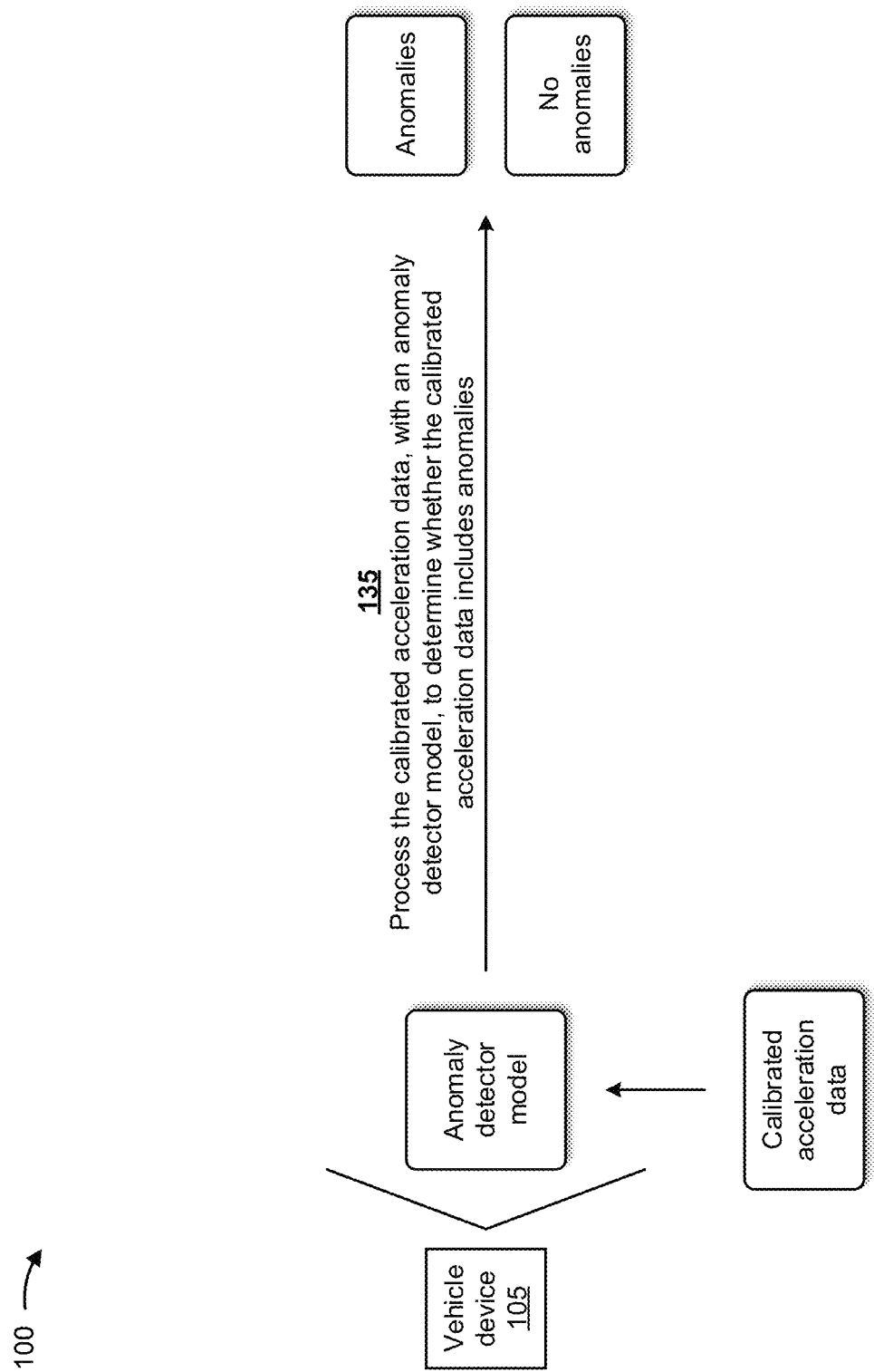

As shown in FIG. 1D, and by reference number 135, vehicle device 105 may process the calibrated acceleration data, with an anomaly detector model, to determine whether the calibrated acceleration data includes anomalies. In some implementations, vehicle device 105 may train the anomaly detector model, in a manner similar to the model described above in connection with FIG. 1B, to generate a trained anomaly detector model. In some implementations, rather than training the anomaly detector model, vehicle device 105 may obtain the anomaly detector model from another system or device that trained the anomaly detector model to generate the trained anomaly detector model. In this case, vehicle device 105 may provide the other system or device with the historical calibrated acceleration data for use in training the anomaly detector model, and may provide the other system or device with updated historical calibrated acceleration data to retrain the anomaly detector model in order to update the anomaly detector model.

In some implementations, when processing the calibrated acceleration data with the anomaly detector model, vehicle device 105 may determine an acceleration norm of the calibrated acceleration data, and may normalize the acceleration norm to generate normalized data. Vehicle device 105 may process the normalized data, with a multi-lags Teager energy operator to determine a maximum energy value, and may determine that the calibrated acceleration data includes an anomaly when the maximum energy value is greater than a threshold value.

For example, vehicle device 105 may detect anomalies in the acceleration data by analyzing a maximum of a non-linear response of a Teager-Kaiser (TK) energy operator by determining an acceleration norm of the acceleration data taken over an x-y component associated with the x axis and y axis (e.g., excluding the z axis because the acceleration in the z direction may be more sensitive to ground holes and speed bumps), by normalizing the acceleration norm by subtracting a median value (e.g., to generate normalized data and to avoid possible artifacts of the calibration of the acceleration data described above), and by processing the normalized data by applying a multi-lags Teager energy operator to produce acceleration TK energy, as follows:

$$y[n] = \Sigma_{l \in lags} x[n]^2 - x[n-l]x[n+l],$$

where the lag values (e.g., past date values) may correspond to 0.01 seconds, 0.05 seconds, and 0.10 seconds. Vehicle device 105 may then extract a maximum value of the acceleration TK energy, and may determine that an anomaly exists in the acceleration data if the maximum value exceeds a particular threshold that can be empirically derived from the acceleration data.

Figure 1E:
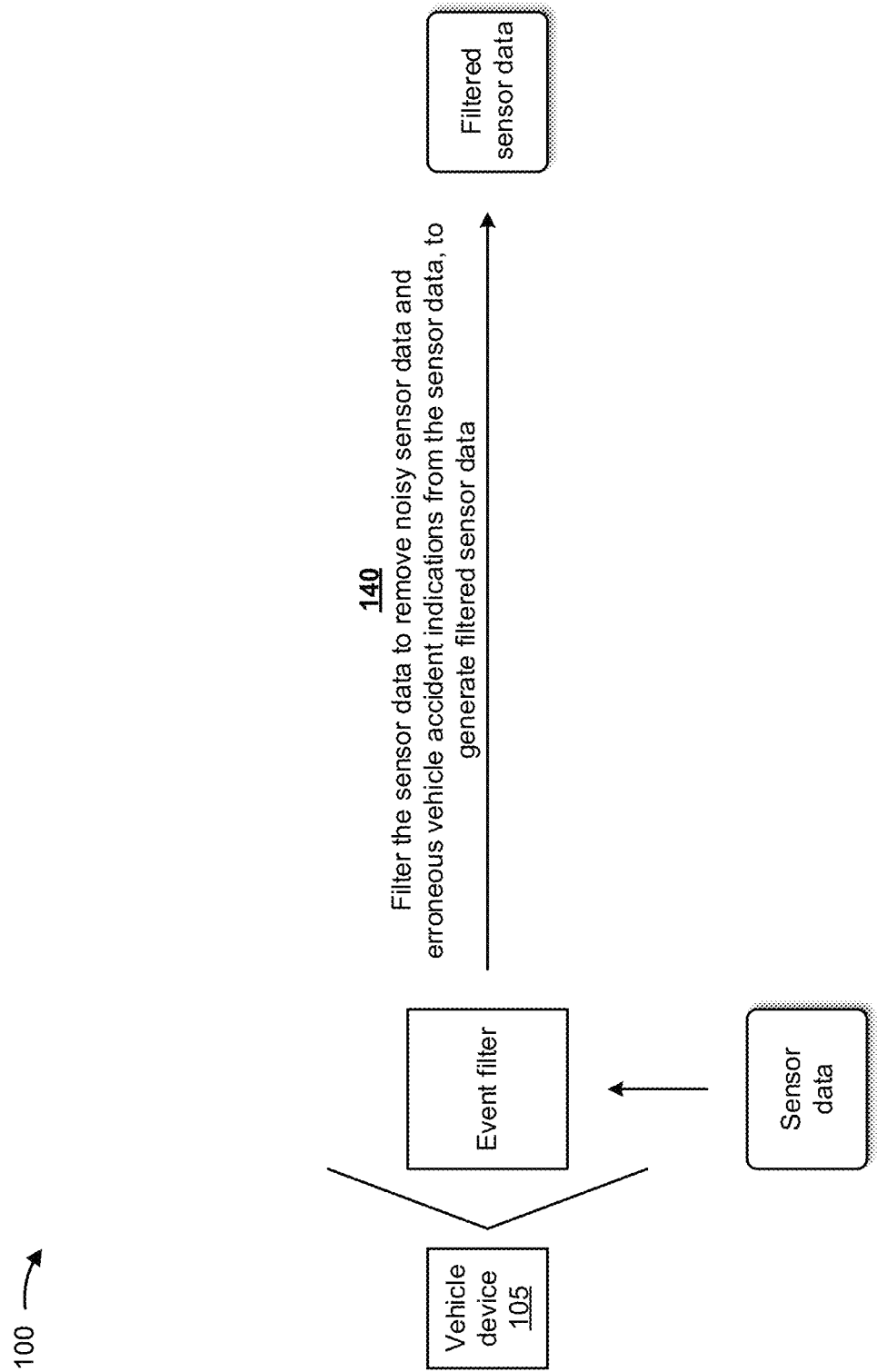

As shown in FIG. 1E, and by reference number 140, vehicle device 105 may filter the sensor data to remove noisy sensor data and erroneous vehicle accident data (e.g., indications) from the sensor data, to generate filtered sensor data. For example, vehicle device 105 may remove false positive values indicative of vehicle accidents, from the sensor data, to generate the filtered sensor data. In some implementations, vehicle device 105 may apply a noise filter to filter out white noise with a large variance from the sensor data (e.g., since too-noisy signals may be wrongly classified as vehicle accident). Additionally, or alternatively, vehicle device 105 may remove erroneous vehicle accident data from the sensor data (e.g., to remove false positives such as may be caused by potholes, speed bumps, and/or the like). As one example, vehicle device 105 may filter out sensor data indicating a median of acceleration, such as a TK maximum value, that is greater than zero immediately following a potential accident indication.

As shown in FIG. 1F, and by reference number 145, vehicle device 105 may process the filtered sensor data and data identifying the anomalies, with a decision model, to determine whether the probability of the vehicle accident satisfies a second threshold probability. In some implementations, vehicle device 105 may train the decision model, in a manner similar to the model described above in connection with FIG. 1B, to generate a trained decision model. In some implementations, rather than training the decision model, vehicle device 105 may obtain the decision model from another system or device that trained the decision model to generate the trained decision model. In this case, vehicle device 105 may provide the other system or device with historical filtered sensor data and historical data identifying anomalies for use in training the decision model, and may provide the other system or device with updated historical filtered sensor data and historical data identifying anomalies to retrain the decision model in order to update the decision model.

If the decision model determines that the probability of the vehicle accident satisfies the second threshold probability, vehicle device 105 may continue processing, as described below. If the decision model determines that the probability of the vehicle accident fails to satisfy the second threshold probability, vehicle device 105 may terminate processing. In this case, vehicle device 105 may provide, to vehicle platform 115 and/or an operator of vehicle 110, an indication that a vehicle accident does not appear to have occurred. Additionally, or alternatively, if vehicle device 105 determines that the probability of the vehicle accident fails to satisfy the second threshold probability, vehicle device 105 may receive new sensor data and/or new video data associated with vehicle 110. In this case, vehicle device 105 may process the new sensor data and/or new video data, with the rule-based detector model, to again determine whether a probability of a vehicle accident satisfies the first threshold probability.

Figure 1G:
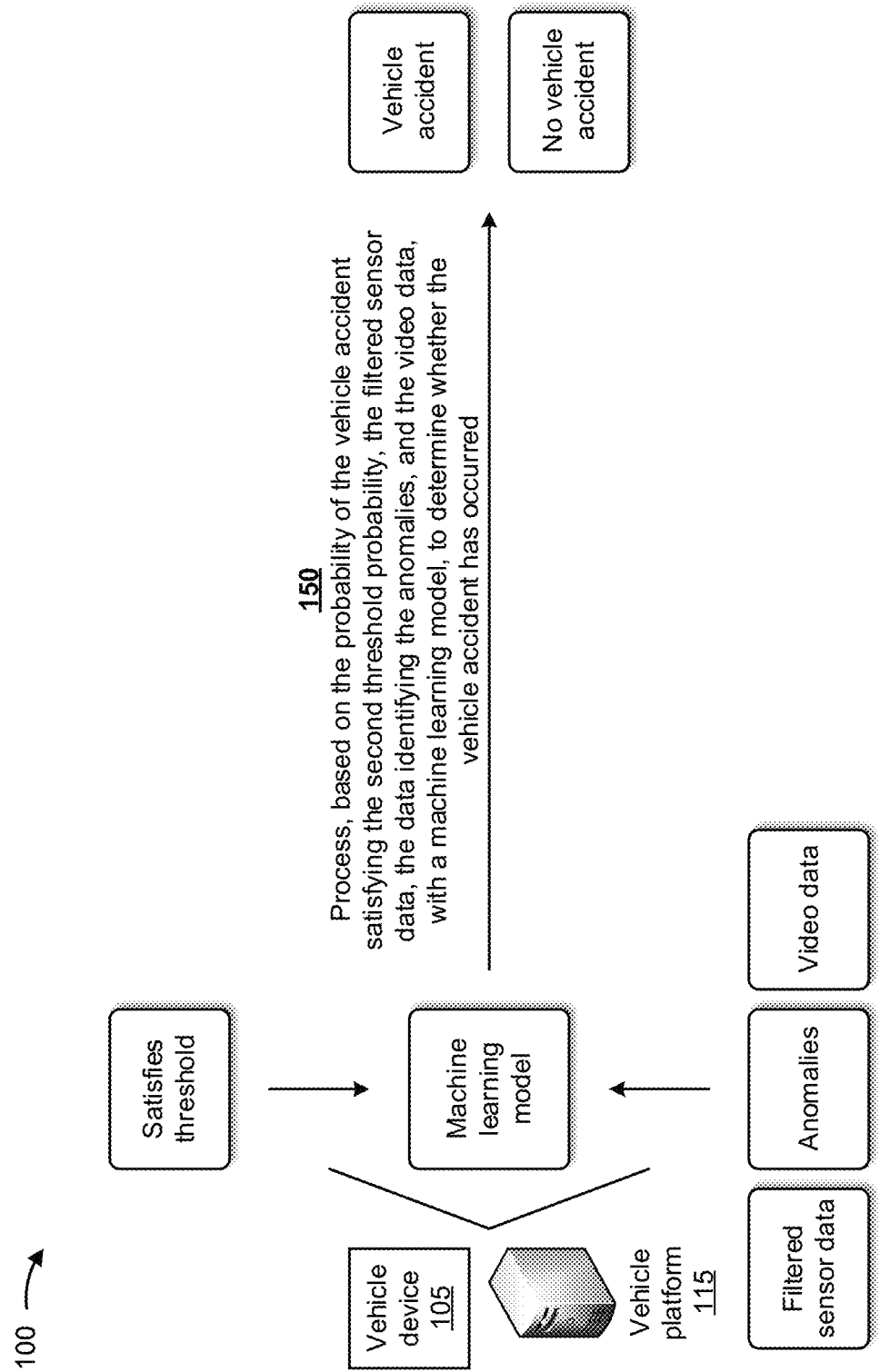

As shown in FIG. 1G, and by reference number 150, vehicle device 105 may process, based on the probability of the vehicle accident satisfying the second threshold probability, the filtered sensor data, the data identifying the anomalies, and the video data, with a machine learning model, to determine whether the vehicle accident has occurred. In some implementations, vehicle device 105 may train the machine learning model, in a manner similar to the model described above in connection with FIG. 1B, to generate a trained machine learning model. In some implementations, rather than training the machine learning model, vehicle device 105 may obtain the machine learning model from another system or device that trained the machine learning model to generate the trained machine learning model. In this case, vehicle device 105 may provide the other system or device with historical data (e.g., historical filtered sensor data, historical data identifying anomalies, historical video data, historical video data indicating vehicle accidents associated with multiple vehicles, data indicating no vehicle accidents associated with multiple vehicles, and/or the like) for use in training the machine learning model, and may provide the other system or device with updated historical data to retrain the machine learning model in order to update the machine learning model.

In some implementations, the machine learning model may include one or more convolutional neural network models, one or more recurrent neural network models, and/or the like. In some implementations, when processing the filtered sensor data, the data identifying the anomalies, and the video data with the machine learning model, vehicle device 105 may process the video data, with two independent bi-dimensional convolutional neural network models, to extract a video embedding and a motion embedding associated with the video data. Vehicle device 105 may concatenate the video embedding and the motion embedding to generate a time-varying stream, and may process the time-varying stream, with a time aware neural network model, to determine whether a vehicle accident has occurred.

If vehicle device 105 determines that a vehicle accident has occurred, vehicle platform 115 may provide, to vehicle platform 115, a notification indication that an accident appears to have occurred. If vehicle device 105 determines that a vehicle accident has not occurred, vehicle device 105 may terminate processing. In this case, vehicle device 105 may provide, to vehicle platform 115 and/or an operator of vehicle 110, an indication that a vehicle accident does not appear to have occurred. Additionally, or alternatively, if vehicle device 105 determines that a vehicle accident has not occurred, vehicle device 105 may receive new sensor data and/or new video data associated with vehicle 110. In this case, vehicle device 105 may process the new sensor data and/or new video data, with the rule-based detector model, to determine whether a probability of a vehicle accident satisfies a first threshold probability.

As shown in FIG. 1H, and by reference number 155, if vehicle device 105 determines that a vehicle accident has occurred, vehicle platform 115 may receive, from vehicle device 105, information indicating that the vehicle accident has occurred. In this way, vehicle platform 115 may be promptly notified about the accident, and may enable users of vehicle platform 115 to review and analyze information about the accident, video of the accident, and/or the like.

Figure 1I:
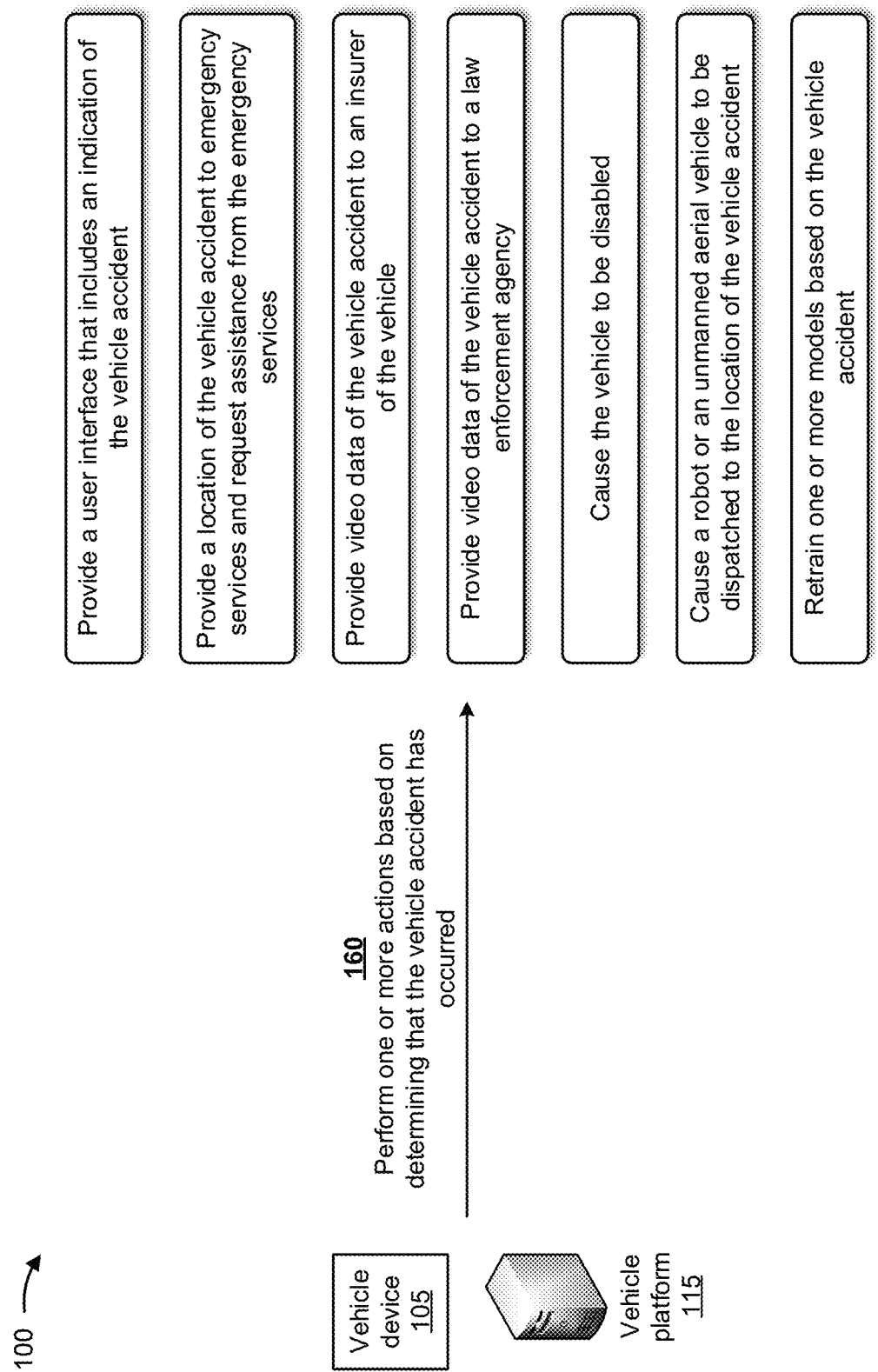

As shown in FIG. 1I, and by reference number 160, vehicle device 105 and/or vehicle platform 115 may perform one or more actions based on determining that the vehicle accident has occurred. In some implementations, the one or more actions may include vehicle platform 115 providing a user interface that includes an indication of the vehicle accident. For example, the user interface may include a list of accidents (e.g., associated with a vehicle fleet), a map that shows locations of the accidents, a video of the vehicle accident, and/or the like. The user interface may allow the user to select a location from the locations, and may display additional information to the user about the selected location. In this way, vehicle platform 115 may conserve computing resources, network resources, and/or the like that would otherwise be wasted in investigating vehicle accidents for liability purposes, contacting emergency personnel, handling legal ramifications associated with vehicle accidents, and/or the like.

In some implementations, the one or more actions may include vehicle device 105 and/or vehicle platform 115 providing a location of the vehicle accident to emergency services and requesting assistance from the emergency services. For example, upon identifying a vehicle accident and a location of the vehicle accident, vehicle device 105 and/or vehicle platform 115 may automatically contact one or more emergency services (e.g., ambulance services, emergency medical technician services, fire services, police services, hospitals, and/or the like) and may provide location information (e.g., a street address, cross streets, GPS coordinates, and/or the like) to the emergency services. In this way, vehicle device 105 and/or vehicle platform 115 may conserve computing resources, networking resources, and/or the like that would otherwise be wasted in communicating the vehicle accident and/or location to emergency services. This may reduce a response time for the accident and minimize location errors by the emergency services, may save lives, improve the safety of those involved in vehicle accidents, and reduce liability costs associated with the vehicle accidents.

In some implementations, the one or more actions may include vehicle device 105 and/or vehicle platform 115 providing video data of the vehicle accident to an insurer of the vehicle. In this way, vehicle device 105 and/or vehicle platform 115 may enable the insurer to assess, establish, prove, and/or disprove liability associated with the vehicle accident, to adjust coverage and/or a cost of coverage (e.g., associated with vehicle 110, an owner of vehicle 110, a driver of vehicle 110, a fleet that includes vehicle 110, and/or the like), and/or the like. Additionally, or alternatively, the insurer may provide guidance and/or training to the owner, fleet, or driver of vehicle 110 (e.g., in exchange for not increasing coverage costs) in order to reduce risks of accidents, tickets, and/or the like, which may improve road safety, conserve fuel, and conserve resources that would otherwise be wasted handling insurance claims, policing poor driving behavior, handling vehicle accidents, performing vehicle repairs, and/or the like.

In some implementations, the one or more actions may include vehicle device 105 and/or vehicle platform 115 providing video data of the vehicle accident to a law enforcement agency. In this way, vehicle platform 115 may enable the law enforcement agency to assess, establish, prove, and/or disprove guilt, fault, liability, and/or the like associated with the vehicle accident; more fairly and/or efficiently prosecute or refrain from prosecuting violators; issue or refrain from issuing citations, and/or the like. This may reduce costs of enforcing laws, and reduce risks of vehicle accidents that might otherwise result from dangerous drivers who were not cited or prosecuted. This may improve road safety and conserve resources that would otherwise be wasted in handling insurance claims, policing poor driving behavior, handling vehicle accidents, performing vehicle repairs, and/or the like.

In some implementations, the one or more actions may include vehicle device 105 and/or vehicle platform 115 causing vehicle 110 to be disabled. For example, vehicle device 105 and/or vehicle platform 115 may prevent vehicle 110 from being operated (e.g., because it may be unsafe to operate after the vehicle accident, because the vehicle accident may be an indication of an impaired or poorly performing driver or of unsafe conditions, and/or the like) after the vehicle accident, which would risk death or injury (e.g., to the driver of vehicle 110, passengers of vehicle 110, other drivers, and/or the like), risk damage to property (e.g., damage to vehicle 110, damage to other vehicles, damage to physical property, and/or the like), alter a liability determination, and/or the like. This may conserve resources that would otherwise be wasted in treating injuries, repairing damage, handling vehicle accidents, handling legal actions, and/or the like.

In some implementations, the one or more actions may include vehicle device 105 and/or vehicle platform 115 causing a robot or an unmanned aerial vehicle to be dispatched to the location of the vehicle accident. In this way, vehicle device 105 and/or vehicle platform 115 may enable the automatic delivery, to the site of the vehicle accident, of important supplies, tools, devices, and/or the like that may assist individuals involved in the accident. For example, the robot or the unmanned aerial vehicle may deliver medical supplies to the location of the accident. In this way, vehicle platform 115 may conserve resources that would otherwise be wasted in providing supplies, tools, devices, and/or the like to the location of the vehicle accident, may enable the supplies, tools, devices, and/or the like to be delivered even if vehicle 110 is difficult to reach, and/or the like. This may save lives and improve the health and welfare of those involved in vehicle accidents and reduce liability costs associated with the vehicle accidents.

In some implementations, the one or more actions may include vehicle device 105 and/or vehicle platform 115 retraining one or more of the models described above based on the vehicle accident. In this way, vehicle device 105 and/or vehicle platform 115 may improve the accuracy of the models in determining whether a vehicle accident has occurred or not, determining whether to perform further processing or not, and/or the like, which may improve speed and efficiency of the models and conserve computing resources, networking resources, and/or the like.

In this way, several different stages of the process for identifying a vehicle accident based on vehicle sensor data and video data captured by a vehicle device are automated with models, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes models to identify a vehicle accident based on vehicle sensor data and video data captured by a vehicle device in the manner described herein. Finally, the process for utilizing models to identify a vehicle accident based on vehicle sensor data and video data captured by a vehicle device conserves computing resources, networking resources, and/or the like that would otherwise be wasted in investigating vehicle accidents for liability purposes, contacting emergency personnel, handling legal ramifications associated with vehicle accidents, and/or the like.

As indicated above, FIGS. 1A-1I are provided merely as examples. Other examples may differ from what is described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
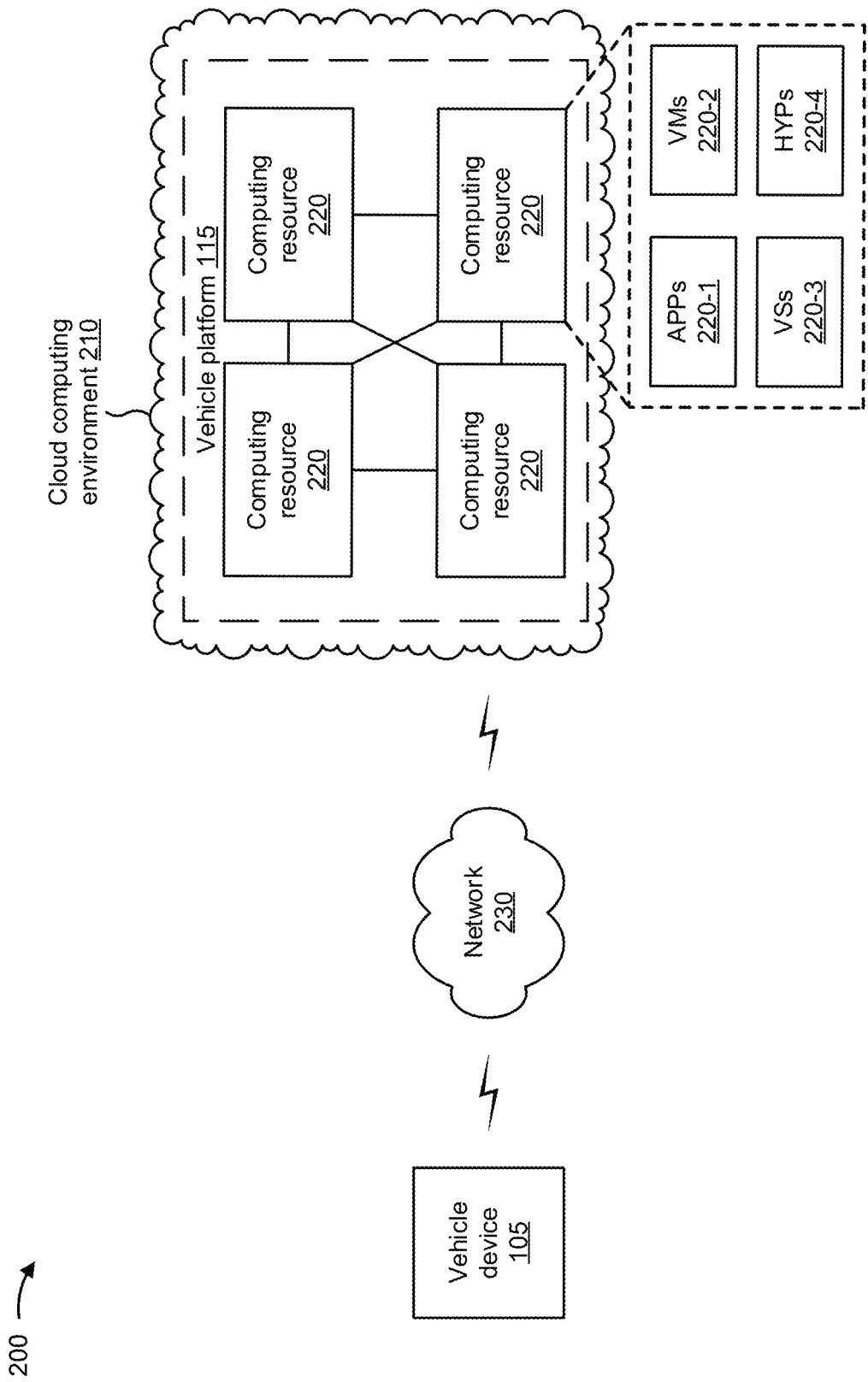
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include vehicle device 105, vehicle platform 115, and a network 230. Devices of environment 200 may interconnect via wired connections, wireless connections, or a combination of wired and wireless connections.

Vehicle device 105 includes one or more devices capable of receiving, generating, storing, processing, and/or providing information, such as information described herein. For example, vehicle device 105 may include a mobile phone (e.g., a smart phone, a radiotelephone, etc.), a laptop computer, a tablet computer, a handheld computer, a device included in vehicle 110 (e.g., an inertial measurement unit, a three-axis accelerometer, a Global Navigation Satellite System (GNSS) device, an OBD device, an ECU, a gyroscope, a dash camera, a parking assist camera, a backup assist camera, and/or the like) or a similar type of device. In some implementations, one or more vehicle devices 105 may utilize models to identify a vehicle accident based on vehicle sensor data and video data captured by vehicle devices 105. In some implementations, vehicle device 105 may receive information from and/or transmit information to vehicle platform 115.

Vehicle platform 115 includes one or more devices that utilize models to identify a vehicle accident based on vehicle sensor data and video data captured by vehicle device 105. In some implementations, vehicle platform 115 may be designed to be modular such that certain software components may be swapped in or out depending on a particular need. As such, vehicle platform 115 may be easily and/or quickly reconfigured for different uses. In some implementations, vehicle platform 115 may receive information from and/or transmit information to one or more vehicle devices 105.

In some implementations, as shown, vehicle platform 115 may be hosted in a cloud computing environment 210. Notably, while implementations described herein describe vehicle platform 115 as being hosted in cloud computing environment 210, in some implementations, vehicle platform 115 may not be cloud-based (i.e., may be implemented outside of a cloud computing environment) or may be partially cloud-based.

Cloud computing environment 210 includes an environment that hosts vehicle platform 115. Cloud computing environment 210 may provide computation, software, data access, storage, etc., services that do not require end-user knowledge of a physical location and configuration of system(s) and/or device(s) that hosts vehicle platform 115. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host vehicle platform 115. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by vehicle device 105. Application 220-1 may eliminate a need to install and execute the software applications on vehicle device 105. For example, application 220-1 may include software associated with vehicle platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of vehicle device 105 or an operator of vehicle platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
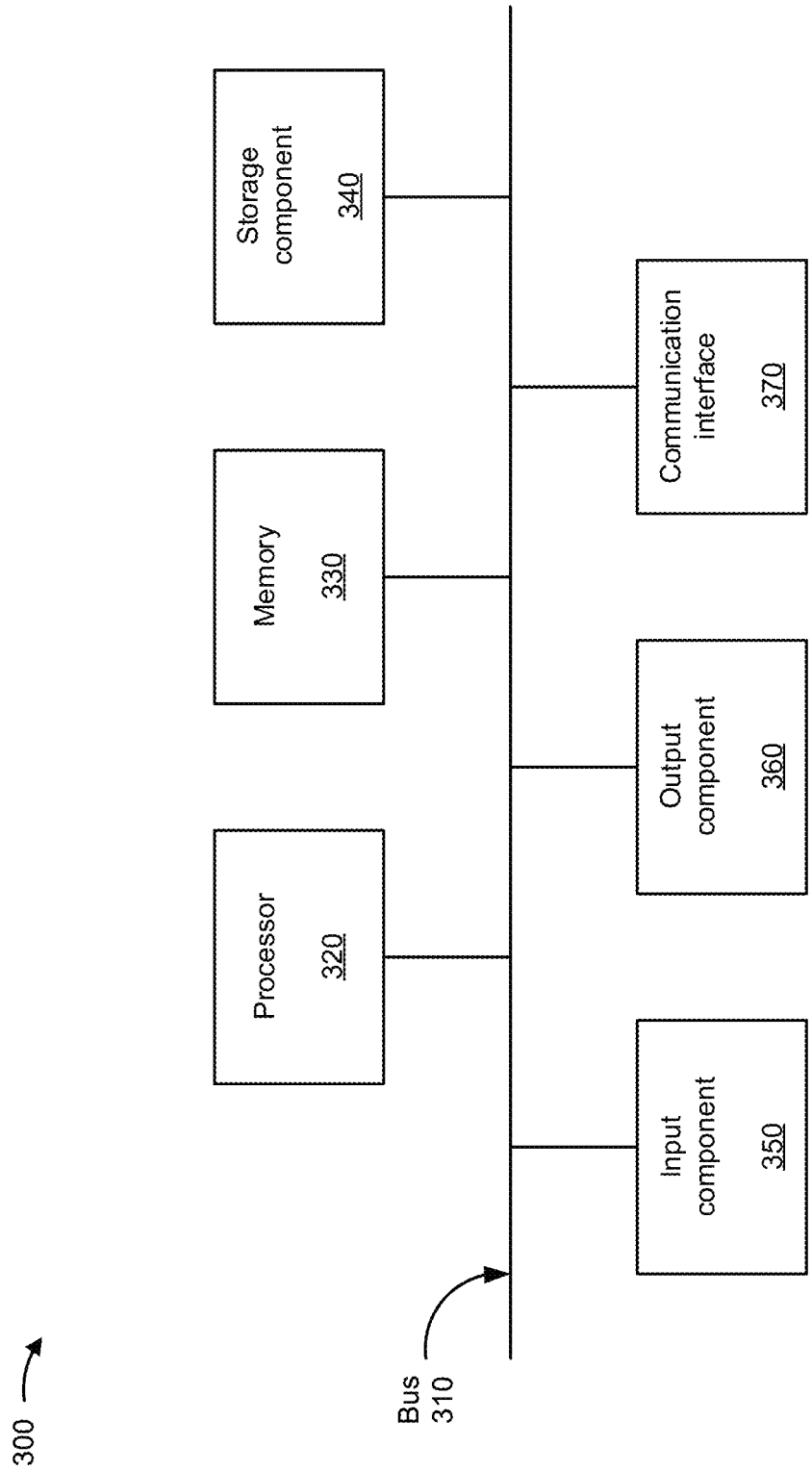
FIG. 3 is a diagram of example components of one or more devices of FIG. 2.

FIG. 3 is a diagram of example components of a device 300. Device 300 may correspond to vehicle device 105, vehicle platform 115, and/or computing resource 220. In some implementations, vehicle device 105, vehicle platform 115, and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
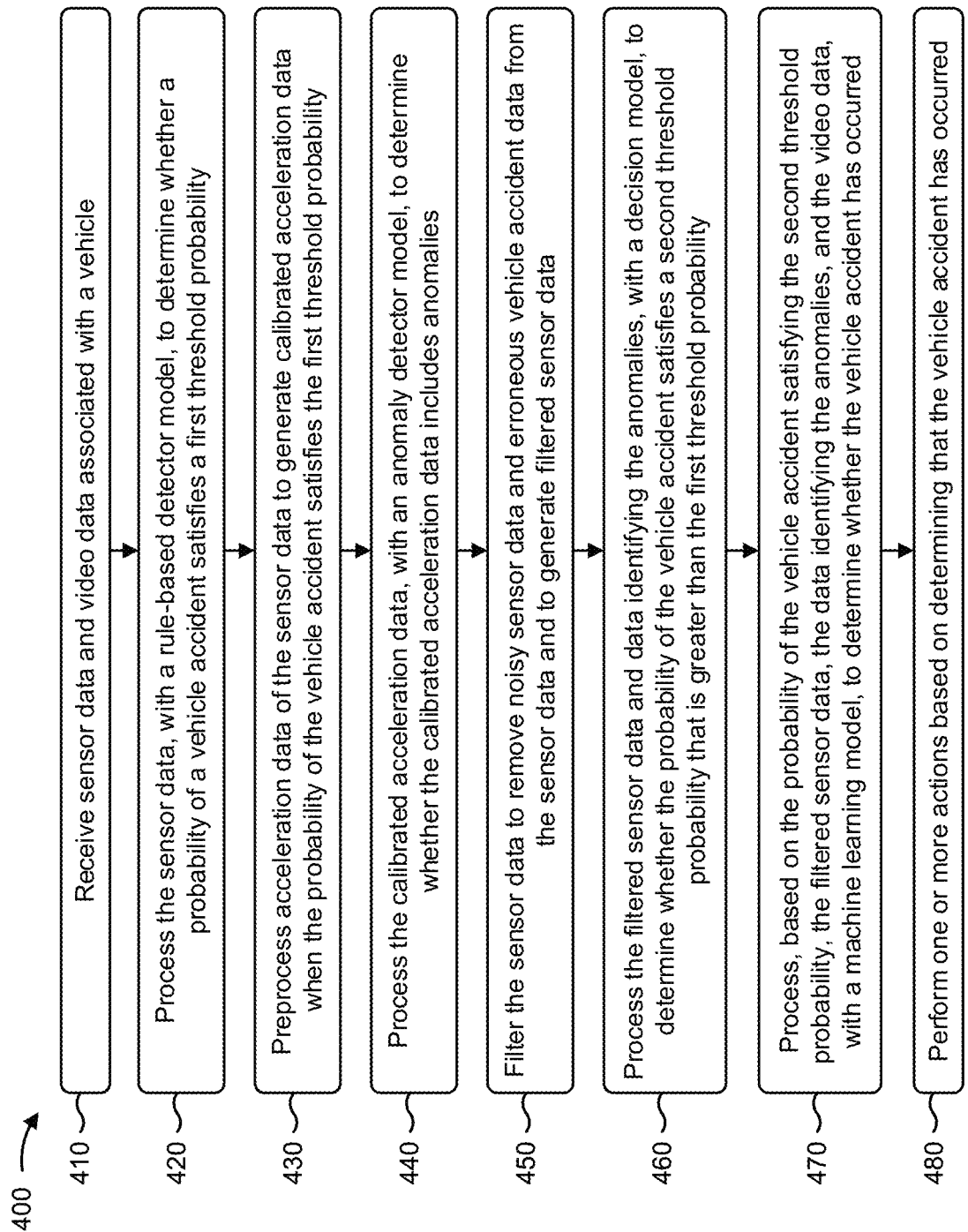
FIG. 4 is a flow chart of an example process for utilizing models to identify a vehicle accident based on vehicle sensor data and video data captured by a vehicle device.

FIG. 4 is a flow chart of an example process 400 for utilizing models to identify a vehicle accident based on vehicle sensor data and video data. In some implementations, one or more process blocks of FIG. 4 may be performed by a device (e.g., vehicle device 105). In some implementations, one or more process blocks of FIG. 4 may be performed by another device or a group of devices separate from or including the device, such as a vehicle platform (e.g., vehicle platform 115).

As shown in FIG. 4, process 400 may include receiving sensor data and video data associated with a vehicle that includes the device (block 410). For example, the device (e.g., using processor 320, communication interface 370, and/or the like) may receive sensor data and video data associated with a vehicle that includes the device, as described above. The sensor data may include location data identifying one or more locations of the vehicle during a period of time, speed data identifying speeds of the vehicle during the period of time, acceleration data identifying accelerations of the vehicle during the period of time, gyroscope data identifying angular speeds of the vehicle during the period of time, and/or the like.

As further shown in FIG. 4, process 400 may include processing the sensor data, with a rule-based detector model, to determine whether a probability of a vehicle accident satisfies a first threshold probability (block 420). For example, the device (e.g., using processor 320, memory 330, and/or the like) may process the sensor data, with a rule-based detector model, to determine whether a probability of a vehicle accident satisfies a first threshold probability, as described above.

As further shown in FIG. 4, process 400 may include preprocessing acceleration data of the sensor data to generate calibrated acceleration data when the probability of the vehicle accident satisfies the first threshold probability (block 430). For example, the device (e.g., using processor 320, storage component 340, and/or the like) may preprocess acceleration data of the sensor data to generate calibrated acceleration data when the probability of the vehicle accident satisfies the first threshold probability, as described above. In some implementations, preprocessing the acceleration data may include calibrating the acceleration data to make the acceleration data independent of an accelerometer montage, to generate calibrated acceleration data.

As further shown in FIG. 4, process 400 may include processing the calibrated acceleration data, with an anomaly detector model, to determine whether the calibrated acceleration data includes anomalies (block 440). For example, the device (e.g., using processor 320, memory 330, storage component 340, and/or the like) may process the calibrated acceleration data, with an anomaly detector model, to determine whether the calibrated acceleration data includes anomalies, as described above.

In some implementations, processing the calibrated acceleration data with the anomaly detector model may include determining an acceleration norm of the calibrated acceleration data, normalizing the acceleration norm to generate normalized data, processing the normalized data, with a Teager energy operator to determine a maximum energy value, and determining, when the maximum energy value is greater than a threshold value, that the calibrated acceleration data includes an anomaly.

As further shown in FIG. 4, process 400 may include filtering the sensor data to remove noisy sensor data and erroneous vehicle accident data from the sensor data, to generate filtered sensor data (block 450). For example, the device (e.g., using processor 320, memory 330, and/or the like) may filter the sensor data to remove noisy sensor data and erroneous vehicle accident data from the sensor data, to generate filtered sensor data, as described above. In some implementations, filtering the sensor data may include removing, from the sensor data, false positive values indicative of vehicle accidents, to generate the filtered sensor data.

As further shown in FIG. 4, process 400 may include processing the filtered sensor data and data identifying the anomalies, with a decision model, to determine whether the probability of the vehicle accident satisfies a second threshold probability that is greater than the first threshold probability (block 460). For example, the device (e.g., using processor 320, storage component 340, and/or the like) may process the filtered sensor data and data identifying the anomalies, with a decision model, to determine whether the probability of the vehicle accident satisfies a second threshold probability that is greater than the first threshold probability, as described above.

As further shown in FIG. 4, process 400 may include processing, based on the probability of the vehicle accident satisfying the second threshold probability, the filtered sensor data, the data identifying the anomalies, and the video data, with a machine learning model, to determine whether the vehicle accident has occurred (block 470). For example, the device (e.g., using processor 320, memory 330, storage component 340, and/or the like) may process, based on the probability of the vehicle accident satisfying the second threshold probability, the filtered sensor data, the data identifying the anomalies, and the video data, with a machine learning model, to determine whether the vehicle accident has occurred, as described above. In some implementations, the machine learning model may include one or more convolutional neural network models.

In some implementations, processing the filtered sensor data, the data identifying the anomalies, and the video data with the machine learning model may include processing the video data, with two independent bi-dimensional convolutional neural network models, to extract a video embedding and a motion embedding associated with the video data; concatenating the video embedding and the motion embedding to generate a time-varying stream; and processing the time-varying stream, with a time aware neural network model, to determine whether the vehicle accident has occurred.

As further shown in FIG. 4, process 400 may include performing one or more actions based on determining that the vehicle accident has occurred (block 480). For example, the device (e.g., using processor 320, memory 330, storage component 340, communication interface 370, and/or the like) may perform one or more actions based on determining that the vehicle accident has occurred, as described above.

In some implementations, performing the one or more actions may include providing a user interface that includes an indication of the vehicle accident, providing a location of the vehicle accident to a device associated with an emergency service, providing video data associated with the vehicle accident to a device associated with an insurer of the vehicle, providing the video data associated with the vehicle accident to a device associated with a law enforcement agency, and/or the like.

In some implementations, performing the one or more actions may include causing the vehicle to be disabled, causing a robot or an unmanned aerial vehicle to be dispatched to a location of the vehicle accident, retraining one or more of the rule-based detector model, the anomaly detector model, the decision model, or the machine learning model based on the vehicle accident, and/or the like.

Process 400 may include additional implementations, such as any single implementation or any combination of implementations described below and/or in connection with one or more other processes described elsewhere herein.

In some implementations, when the probability of the vehicle accident fails to satisfy the first threshold probability, process 400 may include receiving new sensor data and new video data associated with the vehicle.

In some implementations, when the probability of the vehicle accident fails to satisfy the second threshold probability, process 400 may include receiving new sensor data and new video data associated with the vehicle.

In some implementations, process 400 may include receiving historical data that includes historical filtered sensor data associated with a plurality of vehicles, historical anomaly data associated with one or more of the plurality of vehicles, historical video data associated with one or more of the plurality of vehicles, data indicating vehicle accidents associated with one or more of the plurality of vehicles, data indicating no vehicle accidents associated with one or more of the plurality of vehicles, and/or the like; and training the machine learning model based on the historical data.

In some implementations, process 400 may include triggering storage of the video data when the probability of the vehicle accident satisfies a first threshold probability.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   determining, by a device and based on sensor data associated with a vehicle, whether a probability of an accident, associated with the vehicle, satisfies a first threshold;
   generating, by the device and when the probability of the accident satisfies the first threshold, calibrated sensor data;
   processing, by the device, the calibrated sensor data, to determine whether the calibrated sensor data includes at least one anomaly;
   processing, by the device, the sensor data and data identifying the at least one anomaly, with a model, to determine whether the probability of the accident satisfies a second threshold that is greater than the first threshold;
   processing, by the device and when the probability of the accident satisfies the second threshold, the sensor data, the data identifying the at least one anomaly, and video data associated with the vehicle, with the model to determine whether the accident occurred,
wherein the video data is captured by another device associated with the vehicle; and
performing, by the device, and based on determining that the accident occurred, one or more actions.

2. The method of claim 1, wherein processing the sensor data and the data identifying the at least one anomaly to determine whether the probability of the accident satisfies the second threshold, comprises:
filtering the sensor data; and
processing the filtered sensor data and the data identifying the at least one anomaly, to determine whether the probability of the accident satisfies the second threshold.

3. The method of claim 1, wherein processing the sensor data and the data identifying the at least one anomaly, to determine whether the probability of the accident satisfies the second threshold, comprises:
filtering the sensor data to remove noise data and erroneous data from the sensor data to generate filtered sensor data; and
processing the filtered sensor data and the data identifying the at least one anomaly, to determine whether the probability of the accident satisfies the second threshold.

4. The method of claim 1, wherein generating the calibrated sensor data includes preprocessing acceleration data associated with the sensor data to generate calibrated acceleration data when the probability of the accident satisfies the first threshold, and
wherein determining whether the calibrated sensor data includes the at least one anomaly includes processing the calibrated acceleration data with an anomaly detector model.

5. The method of claim 1, wherein when the probability of the accident fails to satisfy the first threshold, the method further comprises:
receiving new sensor data and new video data associated with the vehicle.

6. The method of claim 1, further comprising:
providing an indication that the accident did not occur when the probability of the accident fails to satisfy the second threshold.

7. A device, comprising:
one or more processors configured to:
determine, based on sensor data associated with a vehicle, whether a probability of an accident, associated with the vehicle, satisfies a first threshold;
generate, when the probability of the accident satisfies the first threshold, calibrated sensor data;
process the calibrated sensor data to determine whether the calibrated sensor data includes at least one anomaly;
process the sensor data and data identifying the at least one anomaly, with a model, to determine whether the probability of the accident satisfies a second threshold that is greater than the first threshold;
process, when the probability of the accident satisfies the second threshold, the sensor data, the data identifying the at least one anomaly, and video data associated with the vehicle, with the model to determine whether the accident occurred,
wherein the video data is captured by another device associated with the vehicle; and
perform, based on determining that the accident occurred, one or more actions.

8. The device of claim 7, wherein the one or more processors, to process the sensor data and the data identifying the at least one anomaly to determine whether the probability of the accident satisfies the second threshold, are configured to:
filter the sensor data; and
process the filtered sensor data and the data identifying the at least one anomaly, to determine whether the probability of the accident satisfies the second threshold.

9. The device of claim 7, wherein the one or more processors, to process the sensor data and the data identifying the at least one anomaly to determine whether the probability of the accident satisfies the second threshold, are configured to:
filter the sensor data to remove noise data and erroneous data from the sensor data to generate filtered sensor data; and
process the filtered sensor data and the data identifying the at least one anomaly, to determine whether the probability of the accident satisfies the second threshold.

10. The device of claim 7, wherein the one or more processors, to generate the calibrated sensor data, are configured to preprocess acceleration data associated with the sensor data to generate calibrated acceleration data when the probability of the accident satisfies the first threshold, and
wherein the one or more processors, to determine whether the calibrated sensor data includes the at least one anomaly, are configured to process the calibrated acceleration data with an anomaly detector model.

11. The device of claim 7, wherein, when the probability of the accident fails to satisfy the first threshold, the one or more processors are configured to:
receive new sensor data and new video data associated with the vehicle.

12. The device of claim 7, wherein the one or more processors are further configured to:
provide an indication that the accident did not occur when the probability of the accident fails to satisfy the second threshold.

13. The device of claim 7, wherein, when the probability of the accident fails to satisfy the second threshold, the one or more processors are further configured to:
receive new sensor data and new video data associated with the vehicle.

14. The device of claim 7, wherein the calibrated sensor data is generated based on calibrating the sensor data to be independent of vibration effects.

15. A non-transitory computer-readable medium storing a set of instructions, the set of instructions comprising:
one or more instructions that, when executed by one or more processors of a device, cause the device to:
determine, based on sensor data associated with a vehicle, whether a probability of an accident, associated with the vehicle, satisfies a first threshold;
generate, when the probability of the accident satisfies the first threshold, calibrated sensor data;
process the calibrated sensor data to determine whether the calibrated sensor data includes at least one anomaly;
process the sensor data and data identifying the at least one anomaly, with a model, to determine whether the probability of the accident satisfies a second threshold that is greater than the first threshold;
process, when the probability of the accident satisfies the second threshold, the sensor data, the data identifying the at least one anomaly, and video data associated with the vehicle, with the model to determine whether the accident occurred,
wherein the video data is captured by another device associated with the vehicle; and
perform, based on determining that the accident occurred, one or more actions.

16. The non-transitory computer-readable medium of claim 15, wherein the one or more instructions, that cause the device to process the sensor data and the data identifying the at least one anomaly to determine whether the probability of the accident satisfies the second threshold, further cause the device to:
filter the sensor data; and
process the filtered sensor data and the data identifying the at least one anomaly, to determine whether the probability of the accident satisfies the second threshold.

17. The non-transitory computer-readable medium of claim 15, wherein the one or more instructions, that cause the device to process the sensor data and the data identifying the at least one anomaly to determine whether the probability of the accident satisfies the second threshold, further cause the device to:
filter the sensor data to remove noise data and erroneous data from the sensor data to generate filtered sensor data; and
process the filtered sensor data and the data identifying the at least one anomaly, to determine whether the probability of the accident satisfies the second threshold.

18. The non-transitory computer-readable medium of claim 15, wherein the one or more instructions, that cause the device to generate the calibrated sensor data, further cause the device to preprocess acceleration data associated with the sensor data to generate calibrated acceleration data when the probability of the accident satisfies the first threshold, and
wherein the one or more instructions, that cause the device to determine whether the calibrated sensor data includes the at least one anomaly, further cause the device to process the calibrated acceleration data with an anomaly detector model.

19. The non-transitory computer-readable medium of claim 15, wherein the one or more instructions further cause the device to:
receive new sensor data and new video data associated with the vehicle.

20. The non-transitory computer-readable medium of claim 15, wherein, when the probability of the accident fails to satisfy the second threshold, the one or more instructions further cause the device to:
receive new sensor data and new video data associated with the vehicle.

* * * * *